United States Patent
Carlton et al.

(10) Patent No.: US 11,286,195 B2
(45) Date of Patent: *Mar. 29, 2022

(54) GAS RECLAMATION SYSTEM FOR OPTICAL FIBER PRODUCTION

(71) Applicant: Corning Incorporated, Corning, NY (US)

(72) Inventors: Stephen Mitchell Carlton, Rocky Point, NC (US); John Michael Jewell, Wilmington, NC (US); Nikolaos Pantelis Kladias, Horseheads, NY (US); Kochuparambil Deenamma Vargheese, Horseheads, NY (US); Chunfeng Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/387,876

(22) Filed: Apr. 18, 2019

(65) Prior Publication Data

US 2019/0241459 A1   Aug. 8, 2019

Related U.S. Application Data

(62) Division of application No. 15/271,817, filed on Sep. 21, 2016, now Pat. No. 10,308,544.
(Continued)

(51) Int. Cl.
*C03B 37/029* (2006.01)
*C03B 37/025* (2006.01)

(52) U.S. Cl.
CPC ........ *C03B 37/0253* (2013.01); *C03B 37/029* (2013.01); *C03B 2205/42* (2013.01);
(Continued)

(58) Field of Classification Search
None
See application file for complete search history.

(56) References Cited

U.S. PATENT DOCUMENTS

| | | |
|---|---|---|
| 4,030,901 A | 6/1977 | Kaiser |
| 4,400,190 A | 8/1983 | Briere |
| (Continued) | | |

FOREIGN PATENT DOCUMENTS

| | | |
|---|---|---|
| CN | 1421410 A | 6/2003 |
| CN | 1665749 A | 9/2005 |
| (Continued) | | |

OTHER PUBLICATIONS

Machine translation of JP-2004250286-A (Year: 2003) attached to foreign document JP-2004250286-A.*
(Continued)

*Primary Examiner* — Jodi C Franklin
(74) *Attorney, Agent, or Firm* — Robert L. Carlson (57) ABSTRACT

A method of producing an optical fiber is provided that includes the steps of flowing a first gas into an optical fiber draw furnace. The first gas is passed through a heated section configured to contain and heat a glass source from which the optical fiber is drawn, passing the first gas through a muffle which defines a capture chamber. A portion of the first gas is removed through at least one reclaim port operatively coupled to the capture chamber. A second gas flows into a gas screen at a rate configured to substantially recover a pressure drop associated with removing the portion of the first gas.

7 Claims, 8 Drawing Sheets

Related U.S. Application Data (60) Provisional application No. 62/240,674, filed on Oct. 13, 2015.

(52) U.S. Cl.
CPC ...... *C03B 2205/61* (2013.01); *C03B 2205/83* (2013.01); *C03B 2205/91* (2013.01); *Y02P 40/57* (2015.11)

(56) References Cited

U.S. PATENT DOCUMENTS

| | | | |
|---|---|---|---|
| 4,437,870 A | | 3/1984 | Miller |
| 4,673,427 A | * | 6/1987 | Van Der Giessen ........................ C03B 37/027 65/32.5 |
| 5,545,246 A | * | 8/1996 | Lysson .................. C03B 37/029 65/435 |
| 5,637,130 A | | 6/1997 | Nagayama et al. |
| 5,890,376 A | | 4/1999 | Chludzinski |
| 5,974,837 A | | 11/1999 | Abbott et al. |
| 6,192,715 B1 | * | 2/2001 | Orita ..................... C03B 37/029 65/379 |
| 6,345,519 B1 | * | 2/2002 | Dickinson, Jr. ........ C03B 37/027 65/379 |
| 6,484,539 B1 | | 11/2002 | Nordine et al. |
| 6,789,400 B2 | | 9/2004 | Lu et al. |
| 6,810,692 B2 | | 11/2004 | Taru et al. |
| 6,945,079 B2 | * | 9/2005 | Oh .................... C03B 37/02718 65/489 |
| 7,565,820 B2 | | 7/2009 | Foster et al. |
| 7,814,767 B2 | | 10/2010 | Roba et al. |
| 7,823,419 B2 | | 11/2010 | Bae et al. |
| 8,074,474 B2 | | 12/2011 | Filippov et al. |
| 2002/0178762 A1 | * | 12/2002 | Foster .................. C03B 37/029 65/424 |
| 2003/0041628 A1 | * | 3/2003 | Bird ..................... C03B 37/029 65/533 |
| 2003/0200772 A1 | * | 10/2003 | Foster ............... C03B 37/02718 65/424 |
| 2003/0205068 A1 | | 11/2003 | Taru et al. |
| 2004/0013336 A1 | * | 1/2004 | Foster ............... C03B 37/02718 385/4 |
| 2004/0050094 A1 | * | 3/2004 | Thonnelier ......... C01B 21/0444 62/617 |
| 2006/0130524 A1 | * | 6/2006 | Hovinen ............... C03B 37/029 65/32.5 |
| 2010/0212364 A1 | * | 8/2010 | Suzuki ............. C03B 37/02718 65/385 |
| 2014/0186645 A1 | | 7/2014 | Briere et al. |
| 2014/0226948 A1 | * | 8/2014 | Enomoto .............. C03B 37/027 385/147 |
| 2017/0101336 A1 | * | 4/2017 | Carlton ............... C03B 37/0253 |
| 2017/0217821 A1 | * | 8/2017 | Thomas ............ C03B 37/02727 |

FOREIGN PATENT DOCUMENTS

| | | | | |
|---|---|---|---|---|
| EP | 0913368 A2 | | 5/1999 | |
| JP | 59-013640 A | | 1/1984 | |
| JP | 59-088336 A | | 5/1984 | |
| JP | 61191536 A | * | 8/1986 | ............. C03C 25/12 |
| JP | 08119661 A | | 5/1996 | |
| JP | 11-255535 A | | 9/1999 | |
| JP | 2004250286 A | * | 9/2004 | ........... C03B 37/029 |
| JP | 2004250286 A | | 9/2004 | |
| JP | 2012-082089 A | | 4/2012 | |
| JP | 2013-203621 A | | 10/2013 | |
| WO | 1999023040 A1 | | 5/1999 | |

OTHER PUBLICATIONS

Definition of conical as provided by dictionary.com (Year: 2021).*
English Translation of CN201680059833.2 Office Action dated Jul. 2, 2020; 8 Pages; Chinese Patent Office.
Japanese Patent Application No. 2018-518727, Office Action dated Oct. 23, 2020, 10 pages (5 pages of English Translation and 5 pages of Original Document); Japanese Patent Office.
International Search Report and Written Opinion of PCT/US2016/056707 dated Jan. 18, 2017, 14 pages.
JP2004250286A Machine Translation, 10 pages.
Nuttall, William J. et al., "Stop Squandering Helium," Nature, vol. 485, May 31, 2012, pp. 573-575.
International Search Report and Written Opinion PCT/US2016/056707 dated Jan. 18, 2017.
William J. Nuttall et al., "Resources: Stop squandering helium", Nature 485, 573575, 2012.
JP2004250286 machine translation as provided by https://dossier1.j-platpat.inpit.go.jp/cgi-bin/tran_web_cgi_ejje?u=http://dossier1.j-platpat.inpit.go.jp/tri/translation/ on Jun. 29, 2018 (Year: 2004).

* cited by examiner

GAS RECLAMATION SYSTEM FOR OPTICAL FIBER PRODUCTION

This application is a divisional of U.S. application Ser. No. 15/271,817, filed Sep. 21, 2016, now U.S. Pat. No. 10,308,544, which claims the benefit of priority under 35 U.S.C. § 119 of U.S. Provisional Application Ser. No. 62/240,674 filed on Oct. 13, 2015 the content of which is relied upon and incorporated herein by reference in its entirety.

BACKGROUND

The present disclosure generally relates to methods and apparatus for forming optical fibers and, more particularly, relates to an optical fiber production method for capturing and recycling gases used in optical fiber production.

Conventional manufacturing processes for producing optical fibers typically include drawing an optical fiber from an optical fiber preform in a draw furnace, cooling the drawn fiber, and coating the fiber after it has sufficiently cooled. The optical fiber is typically drawn in a furnace at about 2,000° C. and the heat is typically transported to the preform mostly by radiation, but the flow of gas in the furnace, the result of forced flow from blanketing and natural convection, can also affect the glass temperature. The relative contribution of convective heat transfer is significant at the lower part of the fiber forming zone, the region at the optical fiber preform root and below, where the radiative heat transport generally becomes negligible due to the small diameter of the fiber.

The gas flow in the draw furnace, resulting from forced and free convection, typically creates convection cells. These cells can become unstable under certain conditions of temperature gradient and gas density. The resulting unsteady motion affects the heat transfer in the fiber forming zone enough that the fiber clad diameter can vary significantly, which is generally undesirable. To counteract this effect, Helium may be used as the gas in the furnace. Helium reduces the strength of the convection cells and the temperature difference across the cells. This typically results in improved fiber diameter control, but the disadvantage is that Helium, which is expensive, is consumed, thereby adding a significant cost.

SUMMARY

According to one embodiment of the present disclosure, a method of producing an optical fiber is provided that includes the steps of flowing a first gas into an optical fiber draw furnace. The first gas is passed through a heated section configured to contain and heat a glass source from which the optical fiber is drawn, passing the first gas through a muffle which defines a capture chamber. A portion of the first gas is removed through at least one reclaim port operatively coupled to the capture chamber. A second gas flows into a gas screen at a rate configured to substantially recover a pressure drop associated with removing the portion of the first gas.

According to another embodiment of the present disclosure, a fiber draw furnace is provided that includes an upper muffle and a heated section coupled to the upper muffle. The heated section is configured to contain and heat a glass source from which an optical fiber is drawn. A lower extended muffle is coupled to the heated section at a first end of the lower extended muffle. The lower extended muffle defines a capture chamber at a second end of the lower extended muffle. The lower extended muffle has an adapter tube extending from the second end toward the first end that is substantially coaxial with the lower extended muffle.

According to yet another embodiment of the present disclosure, a fiber draw furnace is provided that includes a heated section configured to contain and heat a glass source from which an optical fiber is drawn and a lower extended muffle has a first end coupled to the heated section. A gas screen is coupled to a second end of the lower extended muffle and includes a housing that defines an inlet and an outlet. A tube extends from the outlet through the housing toward the inlet. A slot is defined between the tube and the inlet of the housing and is configured to allow a gas to flow into the tube.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

Figure 1:
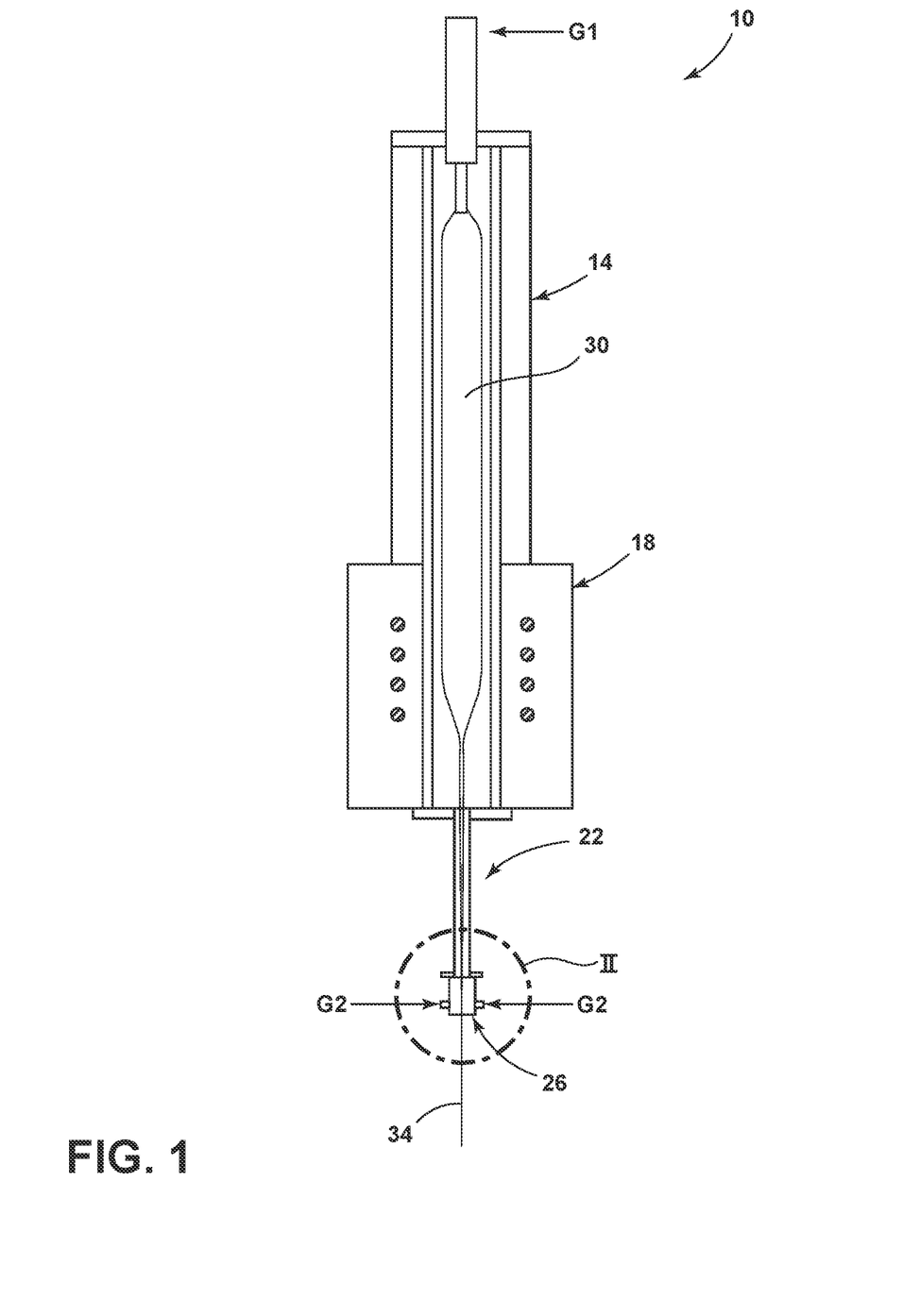
FIG. 1 is cross-sectional view of an optical fiber draw furnace, according to one embodiment.

For purposes of description herein, the terms "upper," "lower," "right," "left," "rear," "front," "vertical," "horizontal," and derivates thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, embodiments depicted in the figures may not be to scale or may incorporate features of more than one embodiment.

Referring to FIG. 1, an optical fiber production system 10 (e.g., a fiber draw furnace) is generally shown, according to one embodiment. The system 10 includes an upper muffle 14, a heated section 18, a lower extended muffle 22, and a bottom gas screen 26. The heated section 18 may be heated to a temperature of about 2,000° C. A glass optical fiber preform 30 is placed in the heated section 18 and fiber is drawn from the heated fiber preform 30 to create a bare optical fiber 34. The fiber preform 30 may be constructed of any glass or material and may be doped suitable for the manufacture of optical fibers. Once the bare optical fiber 34 is drawn from the preform 30, the bare optical fiber 34 is cooled in the lower extended muffle 22, according to one embodiment. The optical fiber 34 may be drawn from the fiber preform 30 at a rate of between about 30 m/s and about 60 m/s, or between about 40 m/s and about 50 m/s. In a specific embodiment, the optical fiber 34 may be drawn from the fiber preform 30 at a rate of about 42 m/s. The lower extended muffle 22 is shown coupled to an exit of the heated section 18, but it will be understood that the lower extended muffle 22 could be integrally defined by or otherwise connected to the heated section 18. The optical fiber 34 is drawn through the lower extended muffle 22 and through the bottom gas screen 26.

According to various embodiments, a first gas G1 may flow into or be input at a top or upper portion of the system 10. The first gas G1 may be input through a port, an inlet, or a gas screen. The first gas G1 may be input into the system 10 at a flow rate of between about 10 standard liters per minute (slpm) and about 40 slpm, or between about 15 slpm and about 35 slpm, or between about 20 slpm and about 25 slpm. In some embodiments the first gas G1 may be input at a flow rate of about 21 slpm, about 22 slpm, about 23 slpm, or about 24 slpm. The first gas may be an inert, or largely inert, gas such as Helium, neon, Argon, nitrogen or mixtures thereof. The first gas G1 passes or travels through the system 10 downward on a flow path from the top of the system 10 through the upper muffle 14, through the heated section 18 and into the lower extended muffle 22 generally in the same direction that the optical fiber 34 is drawn.

Figure 2:
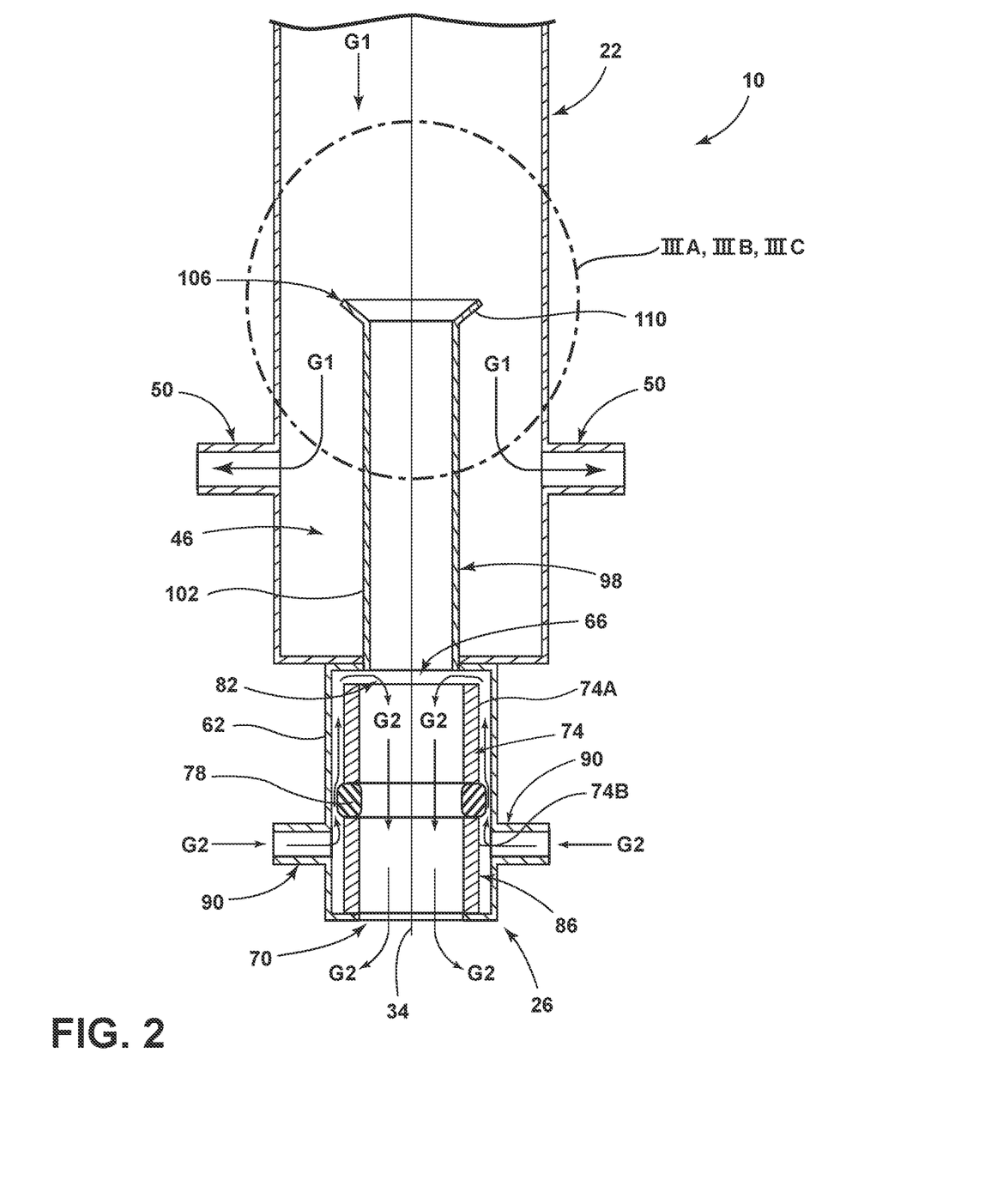
FIG. 2 is an enlarged cross-sectional view of the optical fiber draw furnace taken at section II of FIG. 1, according to one embodiment.

Referring now to FIG. 2, defined within the lower extended muffle 22 is a capture chamber 46. The system 10 includes at least one reclaim port 50 operatively coupled to the capture chamber 46. In the depicted embodiment, positioned on a side of the lower extended muffle 22 proximate to, and operatively coupled with, the capture chamber 46 are a pair of reclaim ports 50 configured to draw in a capture stream of gas within the system 10. The capture stream may include a portion (e.g., greater than 50%, greater than 60%, greater than 70%, greater than 80%, or greater than 90%, or greater than 99%) of the first gas G1 input into the system 10. The percentage of the first gas G1 within the capture stream (i.e., purity) may be greater than about 70%, greater than about 75%, greater than about 80%, greater than about 85%, greater than about 90%, greater than about 95%, or greater than about 99%. The capture stream drawn in by the reclaim ports 50 may have a flow rate of between about 10 slpm and about 40 slpm, or between about 15 slpm and about 35 slpm, or between about 20 slpm and about 30 slpm. In some embodiments the reclaim ports 50 may draw a capture stream having a flow rate of about 29 slpm, about 30 slpm, about 31 slpm, or about 32 slpm. The reclaim ports 50 may carry the capture stream containing the first gas G1 to reclamation and recycling equipment configured to cool, filter and purify the first gas G1 from other gasses in the capture stream. The reclaimed first gas G1 may then be reintroduced at the top of the system 10 or stored for later use. Use of the reclaim ports 50 to remove the capture stream and first gas G1 from the capture chamber 46 may result in a pressure drop occurring within the system 10.

As shown in FIG. 2, the gas screen 26 is positioned at the bottom of the system 10. The gas screen 26 may be wider or thinner than the lower extended muffle 22. The gas screen 26 may aid in preventing the loss of the first gas G1 to an exterior of the system 10 as well as the entraining of air into the system 10 which may contaminate the capture stream drawn by the reclaim ports 50. In the depicted embodiment, the gas screen 26 includes a housing 62 having an inlet 66 positioned proximate the lower extended muffle 22 and an outlet 70 positioned on an opposite side of the housing 62. Extending largely between the inlet 66 and the outlet 70 is a tube 74. The optical fiber 34 is drawn through the housing 62, enters the gas screen 26 through the inlet 66, passes through the tube 74 and passes outside of the system 10 through the outlet 70 of the gas screen 26. In the depicted embodiment, the tube 74 is split into an upper tube 74A and a lower tube 74B separated by an O-ring 78. It will be understood that the upper and lower tubes 74A, 74B may be replaced by a single tube without departing from the spirit of the disclosure. In such an embodiment, the O-ring 78 may extend around the tube 74. The lower tube 74B is operably coupled with the housing 62 proximate the outlet 70. A slot 82 is defined between the upper tube 74A and the housing 62 proximate the inlet 66. The slot 82 is configured to allow gas to flow into the upper tube 74A. The upper tube 74A may not contact the housing 62 proximate the inlet 66 such that the slot 82 extends an entire circumference of the upper tube 74A as a single contiguous opening, or the upper tube 74A may contact the housing 62 in a variety of locations and manners such that the slot 82 includes multiple openings (e.g., multiple holes forming a screen, a grating or a plurality of slots). The slot 82 may have a width of less than about 3 cm, less than about 2 cm, less than about 1 cm, or less than about 0.5 cm. In a specific embodiment, the slot 82 may have a width of about 0.32 cm. The slot 82 fluidly connects an interior of the tube 74 with a cavity 86 defined between the tube 74 and the housing 62. The O-ring 78 is configured to extend into the cavity 86 a predetermined distance.

With further reference to FIG. 2, the reclaim ports 50 may create a pressure drop within the system 10 when the capture stream is drawn in. The development of the pressure drop within the system 10 may be deleterious to the reclamation of the first gas G1. As the pressure drops within the system 10 from the removal of the first gas G1, the air in the atmosphere (e.g., nitrogen, oxygen, carbon dioxide, etc.) proximate the outlet 70 of the gas screen 26 may have a tendency to be drawn into the system 10 and contaminate the capture stream drawn in by the reclaim ports 50. Accordingly, a plurality of gas ports 90 are configured to input a second gas G2 into the system 10 at a flow rate, or amount, configured to recover the pressure drop in the system 10 associated with the removal of the first gas G1 by the reclaim ports 50 in the capture chamber 46. The gas ports 90 may introduce the second gas G2 at a flow rate of between about 1 slpm and about 40 slpm, or between about 5 slpm and about 35 slpm, or between about 10 slpm and about 30 slpm, or between about 25 slpm and about 35 slpm, or between about 28 slpm and about 33 slpm. In some embodiments the gas ports 90 may introduce the second gas G2 at a flow rate of about 8 slpm, about 9 slpm, about 10 slpm, about 11 slpm, about 12 slpm, about 29 slpm, about 30 slpm, about 31 slpm, or about 32 slpm. In other embodiments, the gas ports 90 may introduce the second gas G2 at a flow rate of about 0.5 slpm, about 1 slpm, about 2 slpm, about 3 slpm, about 4 slpm, about 5 slpm, about 6 slpm, or about 7 slpm. The second gas G2 may be an inert, or largely inert, gas such as Helium, neon, Argon, and/or nitrogen. The gas ports 90 are depicted as positioned on opposite sides of the gas screen 26 and at approximately the same height, but may also be staggered in height and have any radial separation therebetween.

The gas ports 90 are positioned below the O-ring 78, proximate the outlet 70 of the gas screen 26 and the lower tube 74B, such that as the second gas G2 is introduced to the gas screen 26, the second gas G2 flows up through the cavity 86 between the O-ring 78 and the housing 62. As the second gas G2 flows between the O-ring 78 and the housing 62, the flow of the second gas G2 is manifolded, made more uniform, or becomes laminar as a result of the geometry of the O-ring 78 and housing 62 (i.e., the flow path of the second gas G2 is constricted). As such, it will be understood that the O-ring 78 may be replaced with a similar structure, or that the housing 62 or tube 74 may define a similar structure, without departing from the spirit of the disclosure. The laminar flow of the second gas G2 then moves towards the slot 82, into the tube 74 and out the outlet 70 of the gas screen 26. As the second gas G2 enters the tube 74, the pressure drop within the system 10 may be substantially (e.g., greater than about 50%, greater than about 60%, greater than about 70%, greater than about 80%, greater than about 90%, greater than about 95%, or greater than about 99%) or fully recovered. With the second gas G2 being eventually lost to the atmosphere through the outlet 70 of the gas screen 26, it may be advantageous for the second gas G2 to be less expensive, or more common, than the first gas G1. For example, the first gas G1 may be Helium and the second gas G2 may be Argon. In various embodiments, the gas screen 26 may employ an oxygen absorber or an oxygen getter (e.g., in the tube 74 or proximate the inlet 66) in order to ensure a minimum amount of oxygen from the atmosphere reaches the reclaim ports 50 (e.g., less than about 30 ppm, less than about 20 ppm or less than about 10 ppm).

Figure 3A:
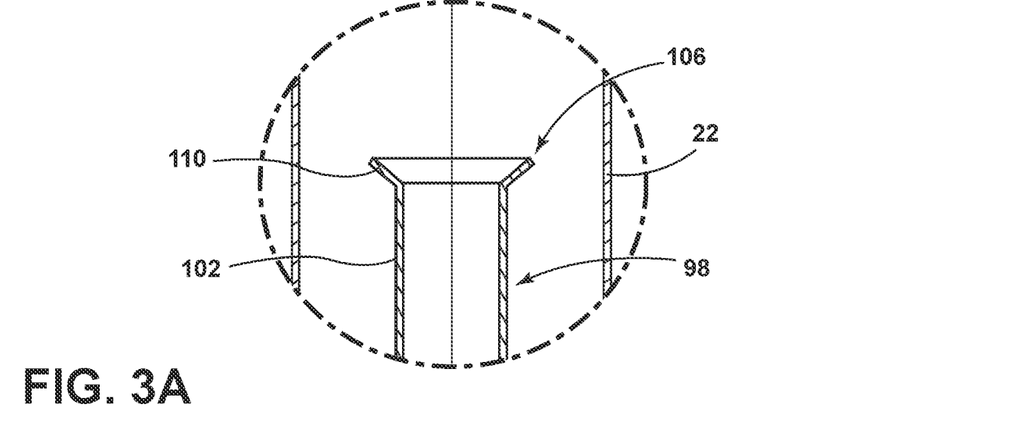
FIG. 3A is an enlarged cross-sectional view taken at section IIIA of FIG. 2, according to one embodiment.
Figure 3B:
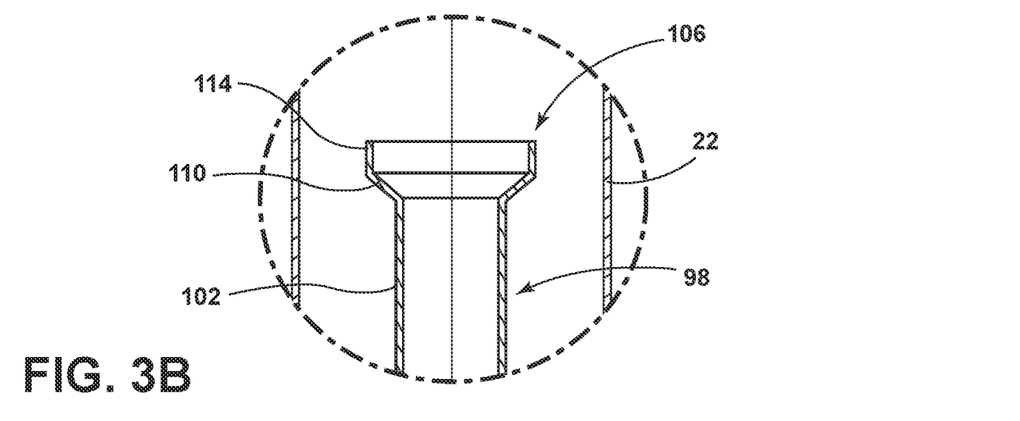
FIG. 3B is an enlarged cross-sectional view taken at section IIIB of FIG. 2, according to another embodiment.
Figure 3C:
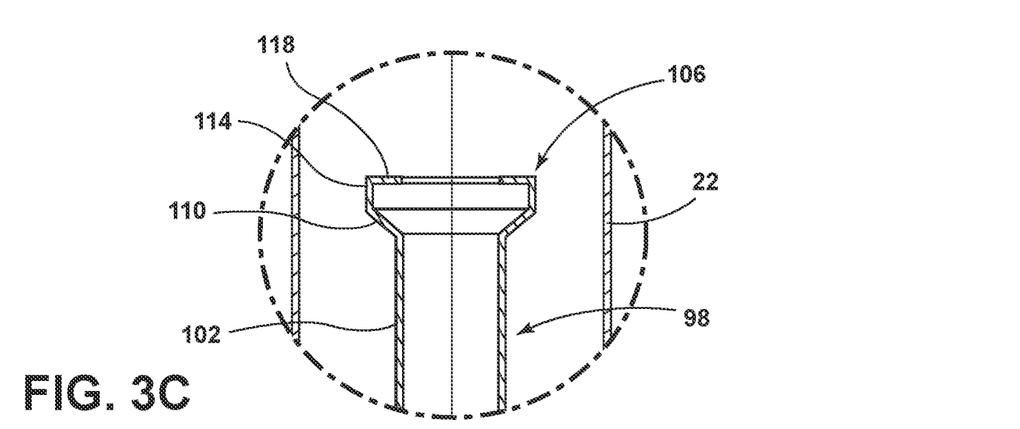
FIG. 3C is an enlarged cross-sectional view taken at section IIIC of FIG. 2, according to a further embodiment.

Referring now to FIGS. 2-3C, extending through the capture chamber 46 of the lower extended muffle 22 is an adapter tube 98. The adapter tube 98 may be coupled to or defined by the inlet 66 of the gas screen 26 or the lower extended muffle 22. The adapter tube 98 includes a body 102 and an entrance 106. The body 102 may be substantially coaxial with the tube 74 of the gas screen 26 such that the optical fiber 34 may pass through the lower extended muffle 22 and the gas screen 26 without being contacted or bent. The body 102 of the adapter tube 98 has sufficient length to pass through the capture chamber 46 such that the entrance 106 to the adapter tube 98 is positioned above the reclaim ports 50. Such an embodiment may be advantageous in that a flow path the second gas G2 or atmosphere surrounding the system 10 takes to enter the reclaim ports 50 is lengthened, thereby decreasing the likelihood that the second gas G2 or atmosphere may migrate toward the reclaim ports 50 and contaminate the capture stream. In various embodiments, this may lead to an increase in the purity of the capture stream of the reclaim ports 50 with respect to the first gas G1. The adapter tube 98 may have an inside diameter of between about 0.25 in (0.635 cm) and about 2.0 in (5.08 cm), or between about 0.5 in (1.27 cm) and about 1.0 in (2.54 cm). In specific embodiments, the inside diameter of the adapter tube 98 may be 0.5 in (1.27 cm), 0.75 in (1.905 cm), 1.0 in (2.54 cm), or 1.25 in (3.175 cm). The adapter tube 98 may have a length of between about 1 in (2.54 cm) and about 10 in (25.4 cm), or between about 2 in (5.08 cm) and about 7 in (17.78 cm). In specific embodiments, the adapter tube 98 may have a length of about 3 in (7.62 cm), about 4 in (10.16 cm), about 5 in (12.7 cm) or about 6 in (15.24 cm).

During production of the optical fiber 34, various particulates (e.g., SiC and/or graphite grains) may be generated in the system 10 and contaminate the optical fiber 34 resulting in breakage of the optical fiber 34 and/or draw induced point defects. Point defects may be measured as a local deviation in the signal from an optical time-domain reflectometry (OTDR) measurement of attenuation of the optical fiber 34. Alteration of the entrance 106 of the adapter tube 98 may decrease or mitigate the number and/or frequency of draw induced point defects. FIGS. 3A-C provide various embodiments of the entrance 106 of the adapter tube 98. The entrance 106 of the adapter tube 98 may take a variety of configurations. In various embodiments, the entrance 106 may include a conical portion 110. The conical portion 110 may be inverted such that the entrance 106 of the adapter tube 98 tapers as it approaches the body 102. Use of the conical portion 110 may be advantageous in reducing the draw induced point defects by reducing a magnitude of a radial component of the first gas G1 velocity vector and therefore reduces flow of the first gas G1 toward a wall of the heated section 18 (FIG. 1) thereby reducing particles entering the lower extended muffle 22 and being recirculated. In a first embodiment (FIG. 3A), the entrance 106 may simply include the conical portion 110 tapering toward the body 102 of the adapter tube 98. In a second embodiment (FIG. 3B), the entrance 102 may incorporate a first flange 114 which is substantially coaxial with the adapter tube 98. The first flange 114 may be placed on top of the conical portion 110 such that the entrance 106 tapers from the first flange 114 to the body 102. In a third embodiment (FIG. 3C), a second flange 118 may be positioned on top of the first flange 114, the second flange 114 being perpendicular to the body 102 of the adapter tube 98 and the first flange 114. The second flange 118 may extend inward and/or outward from the adapter tube 98. Use of the embodiments depicted in FIGS. 3A-C may decrease the draw induced point defects per kilometer of produced optical fiber 34 from about 5% in embodiments with no entrance 106 (e.g., just the body 102 of the adapter tube 98) to less than about 1.5% in embodiments using at least the conical portion 110.

Figure 4:
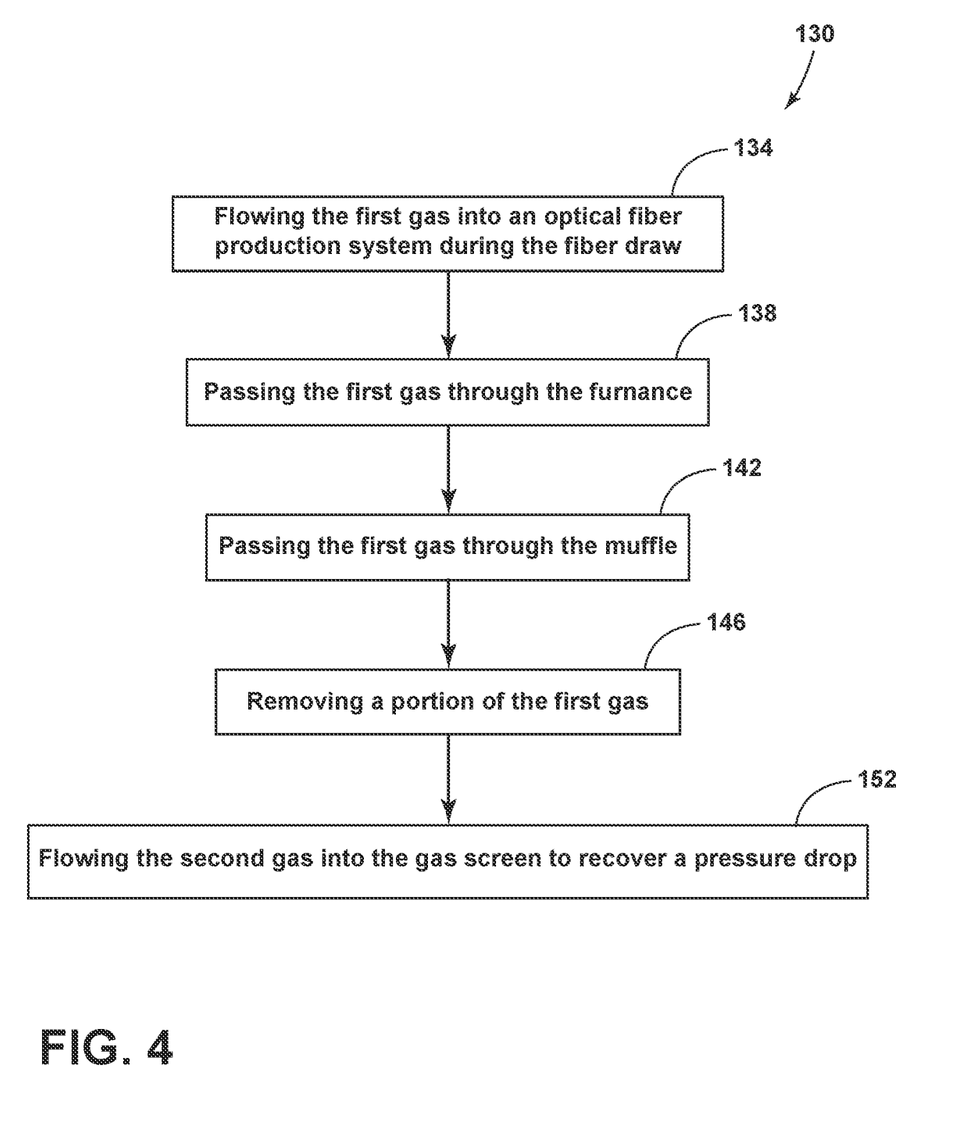
FIG. 4 is a flow diagram illustrating a method of operating the optical fiber draw furnace, according to one embodiment.

Referring now to FIG. 4, an exemplary method 130 of operating the optical fiber production system 10 to produce the optical fiber 34 and reclaim the first gas G1 (e.g., Helium) will now be discussed. A first step 134 may include the action of flowing the first gas G1 into the optical fiber production system 10 during the fiber draw. As explained above, the first gas G1 may be passed into the top of the system 10 through an inlet, a gas screen, port or other method of passing gas into the system 10. Next, a second step 138 of passing the first gas G1 through the heated section 18 may be performed. The first gas G1 moves from the top of the system 10, through the upper muffle 14 and into the heated section 18. As the first gas G1 moves through the heated section 18, it passes over the glass optical fiber preform 30 and the optical fiber 34 being drawn from the preform 30. Next, a third step 142 of passing the first gas G1 through the lower extended muffle 22 is performed. As the first gas G1 is moving through the lower extended muffle 22, a portion of the first gas G1 enters the capture chamber 46 and the balance of the first gas G1 follows closely to the optical fiber 34 is passed through the adapter tube 98. Next, the portion of the first gas G1 that enters the capture chamber 46 proximate the adapter tube 98 is then removed through the reclaim ports 50 in a fourth step 146. The removed portion of the first gas G1 may then be cooled, cleaned, recycled and reused. Finally, a fifth step 152 of flowing the second gas G2 into the gas screen 26 to recover a pressure drop is performed. As explained above, removal of a portion of the first gas G1 through the reclaim ports 50 creates a pressure drop, or a negative pressure, within the system 10 which may result in the entrainment of atmosphere (e.g., nitrogen and oxygen) through the outlet 70 of the gas screen 26. As such, the second gas G2 may be passed into the gas screen 26 to neutralize the negative pressure, or otherwise recover the pressure drop associated with removal of the first gas G1.

EXAMPLES

Referring now to FIGS. 5A-D, depicted are various graphs showing the percentage of Helium (e.g., the first gas G1) captured by the reclaim ports 50 in a simulation of the system 10, according to various examples with changed parameters of the system 10.

Figure 5A:
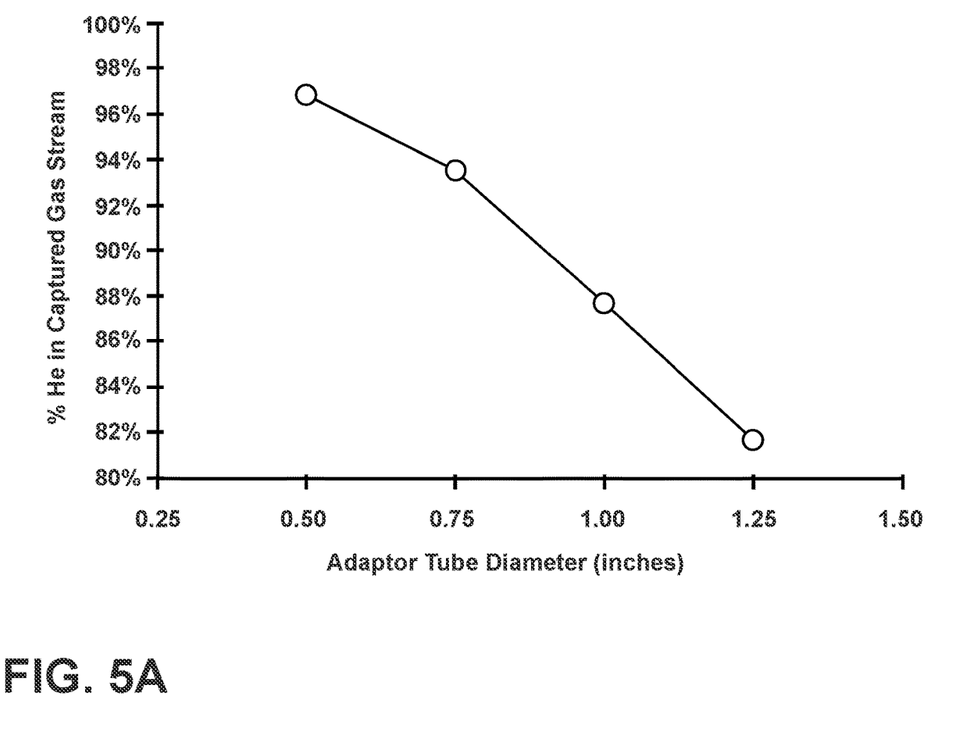
FIG. 5A is a graph depicting percentage Helium capture of the optical fiber draw furnace, according to one example.

Referring now to FIG. 5A, depicted is the percentage, or purity, of Helium within a gas stream captured from the system 10 (e.g., through the reclaim ports 50) as it relates to the diameter of the adapter tube 98 in a simulation. In this specific example, the reclaim ports 50 had a captured flow rate of about 32 slpm, the adapter tube 98 had a length of about 3 in (7.62 cm), the optical fiber 34 was pulled at a speed of about 42 m/s, and the second gas was input into the gas screen 26 at a rate of about 10 slpm. As can be seen by the graph of FIG. 5A, as the diameter of the adapter tube 98 was increased, the percentage of Helium in the captured gas stream decreased. This may be due to the increased ability of the second gas G2 from the gas screen 26 to advance upwards through the adapter tube 98 and through the reclaim ports 50 as the available space in the adapter tube 98 (e.g., the diameter) increases.

Figure 5B:
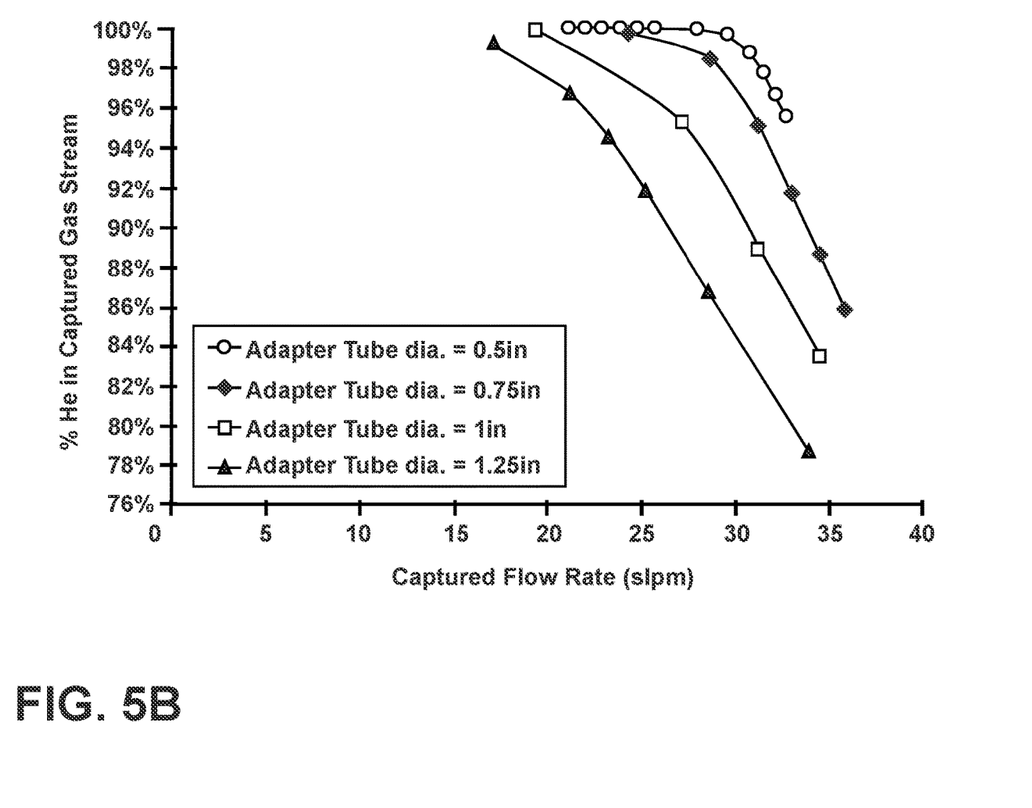
FIG. 5B is a graph depicting percentage Helium capture of the optical fiber draw furnace, according to another example.

Referring now to FIG. 5B, depicted is the percentage of Helium in the captured gas stream through the reclaim ports 50 versus the capture flow rate based on several exemplary diameters of the adapter tube 98. In these simulations, the draw speed of the optical fiber was about 42 m/s, the flow rate from the gas ports 90 of the gas screen 26 was at about 10 slpm, and the adapter tube 98 had length of about 3 in (7.62 cm). Similarly to that seen in FIG. 5A, increasing adapter tube 98 diameter decreases the percentage of Helium in the captured flow through the reclaim ports 50, which corresponds to an increase in capture of air and the second gas G2 through the reclaim ports 50.

Figure 5C:
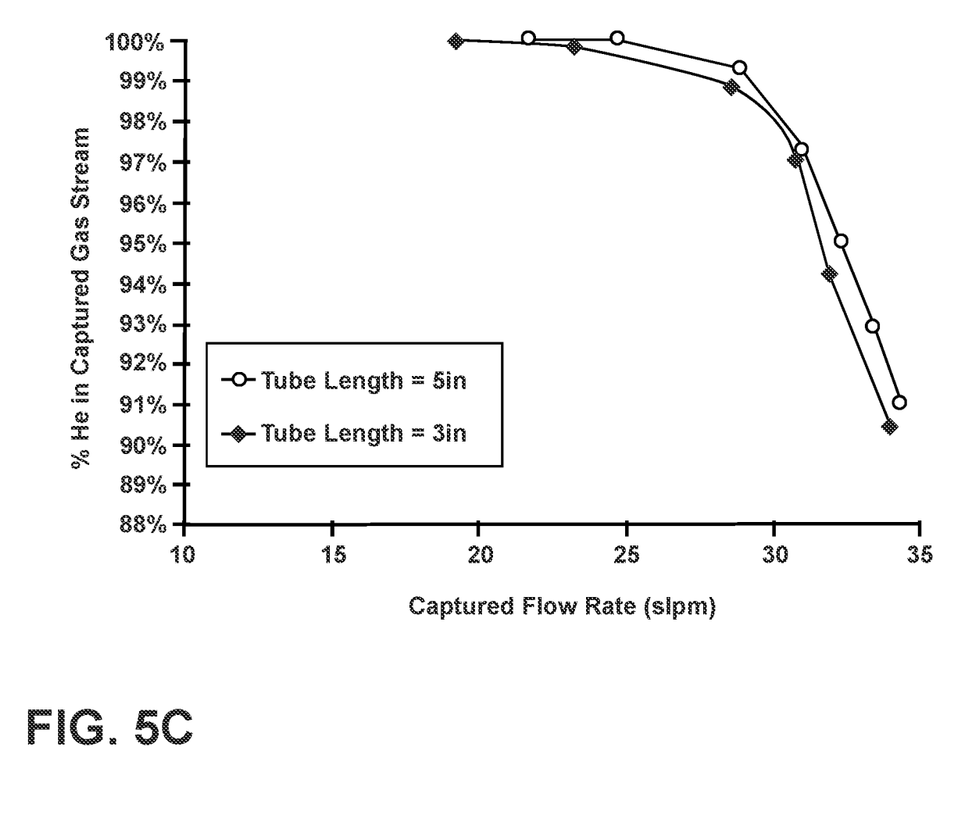
FIG. 5C is a graph depicting percentage Helium capture of the optical fiber draw furnace, according to a further example.

Referring now to FIG. 5C, depicted is the percentage of Helium (e.g., the first gas G1) in the captured gas stream through the reclaim ports 50 versus the capture flow rate based on several exemplary lengths of the adapter tube 98. In these simulations, the draw speed of the optical fiber 34 was about 42 m/s, the flow from the gas ports 90 of the gas screen 26 was at about 10 slpm, and the adapter tube 98 had a diameter of about 0.75 in (1.9 cm). As shown in FIG. 5C, increasing the length of the adapter tube 98 allows a higher captured flow rate to be applied while attaining similar or greater Helium percentages than a shorter adapter tube 98.

TABLE 1

Exemplary configurations of the system 10.

| ID | Internal Diameter (cm) | Length (cm) | Second Gas Port Flow Rate (slpm) | First Gas Flow Rate (slpm) | Optical Fiber Draw Speed (m/s) |
|---|---|---|---|---|---|
| 11a | 1.905 | 7.62 | 10 | 22 | 42 |
| 11b | 1.905 | 7.62 | 10 | 22 | 50 |
| 11c | 1.905 | 7.62 | 0 | 22 | 50 |
| 11d | 1.905 | 7.62 | 10 | 30 | 50 |
| 11e | 1.905 | 7.62 | 10 | 18 | 50 |
| 12a | 1.905 | 12.7 | 10 | 22 | 42 |
| 12b | 1.905 | 12.7 | 10 | 22 | 50 |

Figure 5D:
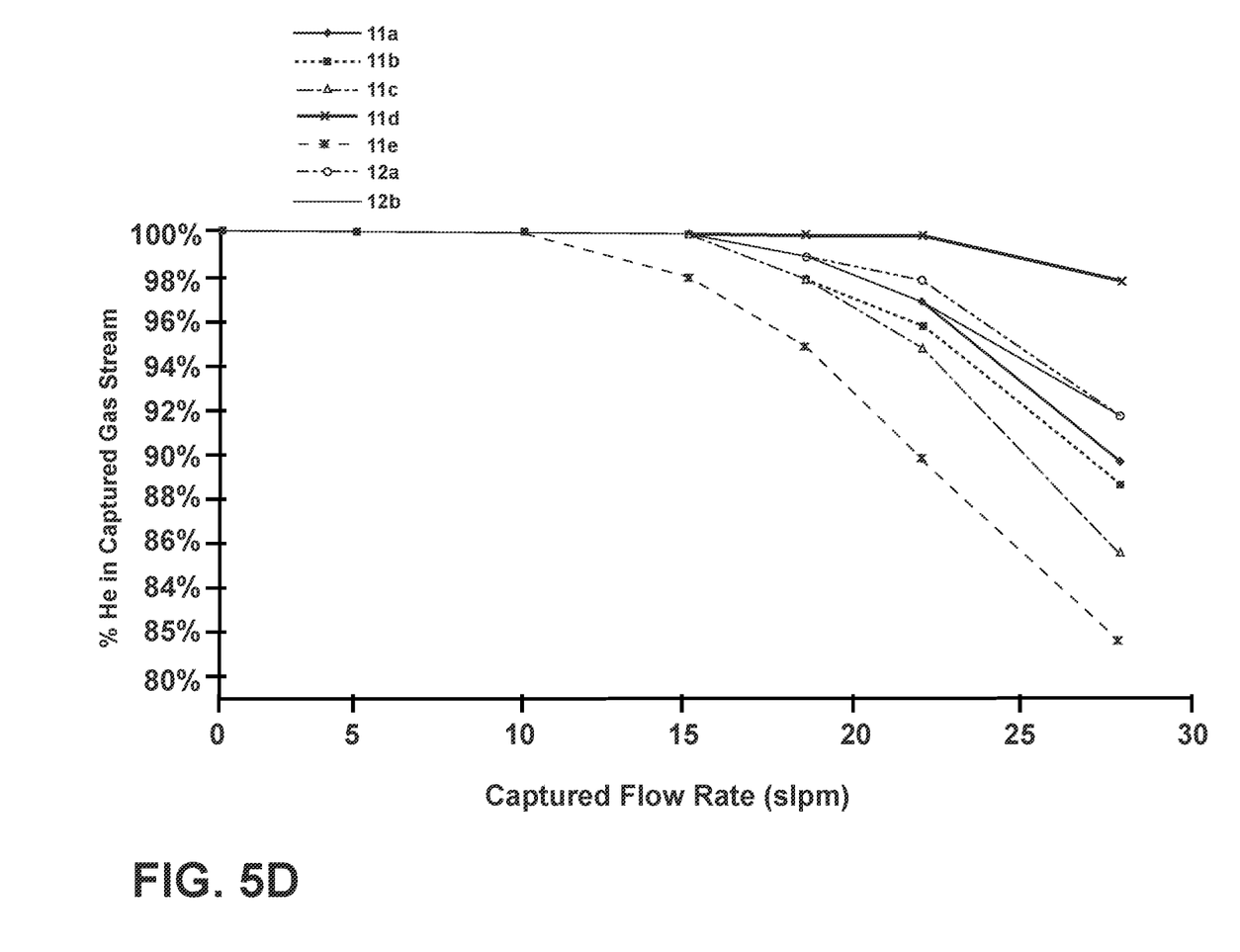
FIG. 5D is graph depicting percentage Helium capture of the optical fiber draw furnace under various system configurations, according to yet a further example.

Referring now to FIG. 5D, depicted is the Helium (e.g., the first gas G1) in the captured gas stream of the sample configurations of Table 1 based on the captured flow rate from the reclaim ports 50. As can be seen in FIG. 5D, as the captured flow rate through the reclaim ports 50 increases, the purity of the Helium in the captured gas stream decreases. Further, as can be seen in FIG. 5D, as the flow rate of the first gas G1 is increased, the percentage of Helium in the captured flow through the reclaim ports 50 increases.

While the embodiments disclosed herein have been set forth for the purpose of illustration, the foregoing description should not be deemed to be a limitation on the scope of the disclosure or the appended claims. It will be apparent to those skilled in the art that various modifications and variations can be made without departing from the spirit or scope of the claims.

It will be understood by one having ordinary skill in the art that construction of the described disclosure and other components is not limited to any specific material. Other exemplary embodiments of the disclosure disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit, unless the context clearly dictates otherwise between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated. It will be apparent to those skilled in the art that various modifications and variations can be made without departing from the spirit or scope of the claims.

What is claimed is:

1. A fiber draw furnace, comprising:
   a heated section configured to contain and heat a glass source from which an optical fiber is drawn;
   a lower extended muffle having a first end coupled to the heated section; and
   a gas screen coupled to a second end of the lower extended muffle, the gas screen comprising:
   a housing defining an inlet and an outlet,
   a tube extending from the outlet through the housing toward the inlet, wherein the housing includes at least two gas ports positioned on the tube, wherein a slot is defined between the tube and the inlet of the housing and is configured to allow a gas to flow into the tube, and
   a circular structure disposed around the tube and positioned between the at least two gas ports and the slot to restrict a width of an opening between the housing and the tube to create a drop in pressure of the gas to create a laminar flow of the gas from the at least two gas ports towards the slot.

2. The fiber draw furnace of claim 1, wherein the gas screen housing includes the at least two gas ports positioned on opposite sides of the tube.

3. The fiber draw furnace of claim 2, wherein the at least two gas ports are positioned proximate the outlet.

4. The fiber draw furnace of claim 2, wherein the circular structure comprises a ring disposed around the tube and positioned between the at least two gas ports and the slot.

5. The fiber draw furnace of claim 1, wherein the lower extended muffle includes an adapter tube disposed therein, the adapter tube extending from the second end of the lower extended muffle toward the first end of the lower extended muffle.

6. The fiber draw furnace of claim 5, wherein the tube is substantially coaxial with the adapter tube.

7. The fiber draw furnace of claim 1, wherein the lower extended muffle has an adapter tube extending from the first end toward a second end that is substantially coaxial with the lower extended muffle, wherein the adapter tube includes a body and an entrance that comprises a conical portion that tapers from the entrance to the body.

* * * * *